Nov. 25, 1958     O. C. NORDELL     2,861,761
FISHING ROD HOLDER
Filed Feb. 19, 1954
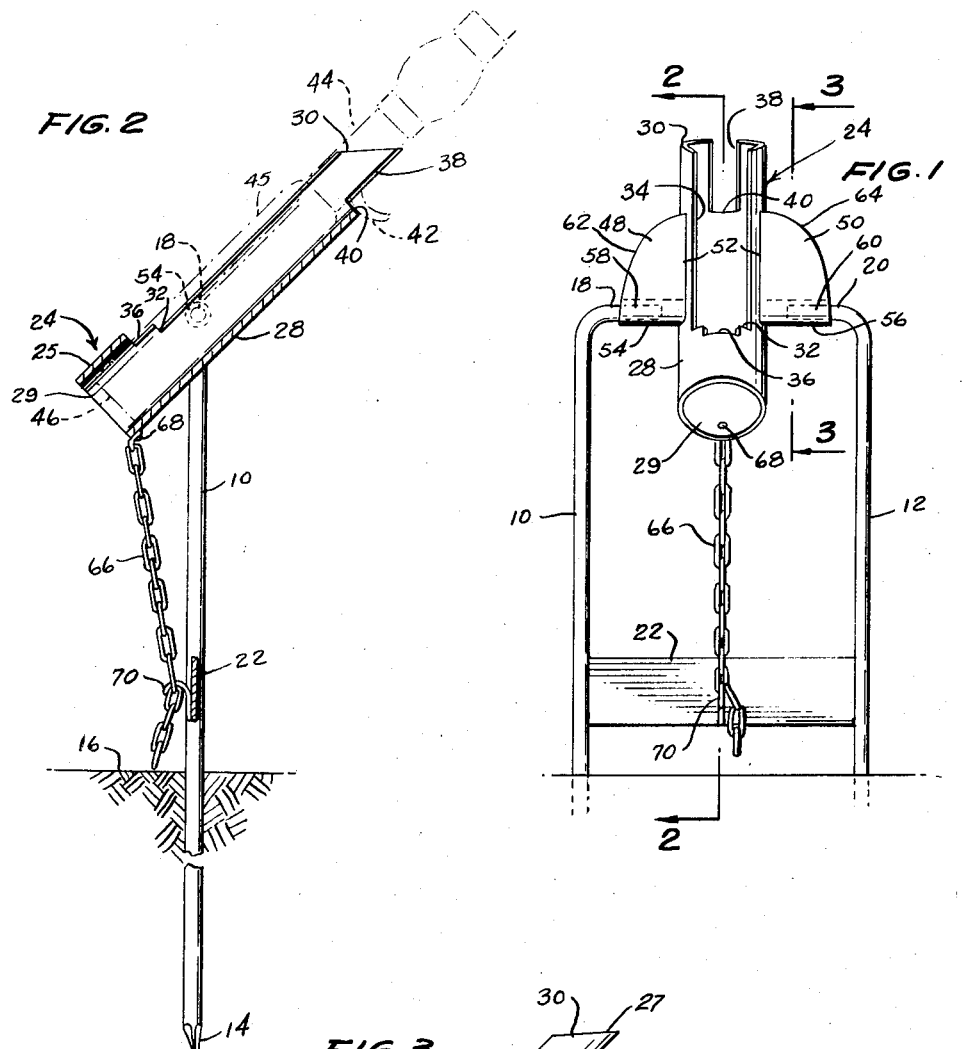
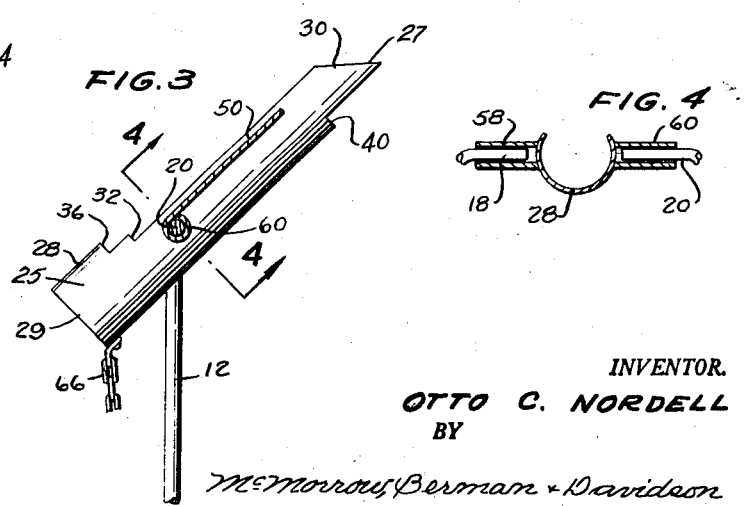
INVENTOR.
OTTO C. NORDELL
BY
McMorrow, Berman & Davidson
ATTORNEYS United States Patent Office 2,861,761
Patented Nov. 25, 1958

2,861,761

FISHING ROD HOLDER

Otto C. Nordell, Fort Lupton, Colo.

Application February 19, 1954, Serial No. 411,308

3 Claims. (Cl. 248—38)

This invention relates to an improved fishing rod holder.

It is an object of this invention to provide a fishing rod holder for holding a fishing rod at any of several selected angles, from which the rod can be quickly and easily withdrawn but from which the rod cannot be dislodged by a forward pull exerted on the associated fishing line.

It is another object of this invention to provide a fishing rod holder in which the rod is held securely against rotation about its longitudinal axis and which does not interfere with the operation of the reel on the rod while the rod is being held by the fishing rod holder.

It is another and still further object of this invention to provide a fishing rod holder which is simply constructed of inexpensive materials and is rugged and durable in use.

Other objects and advantages of the invention will become apparent from the following detailed description, forming the specification, taken in conjunction with the accompanying drawing, in which:

Figure 1 is a rear elevational view of a fishing rod holder embodying this invention;

Figure 2 is a vertical cross sectional view taken on line 2—2 of Figure 1;

Figure 3 is a fragmentary cross sectional view taken on line 3—3 of Figure 1; and Figure 4 is a fragmentary cross sectional view taken on line 4—4 of Figure 3.

With continued reference to the drawings, the illustrated holder comprises a vertical support having a pair of spaced apart vertical stakes 10 and 12 whose lower ends are pointed as at 14 so as to facilitate the stakes being driven into the ground, indicated at 16. Each of the stakes 10 and 12 are formed at their upper ends with laterally inwardly extending arms 18 and 20, respectively. A cross brace 22 is secured at opposite ends to the stakes 10 and 12 and extends therebetween to maintain the stakes 10 and 12 in their spaced apart relation and also to lend rigidity thereto.

The holder further comprises a fishing rod butt socket, generally indicated at 24, which comprises a tube or cylinder 25 having an open forward end 27 and an open rear end 29, and having a side wall 28. The forward end 27 of the tube 25 is downwardly beveled, as indicated at 30.

A relatively long and relatively wide upper slot 34 extends longitudinally in the top of the side wall 28 from the open forward end 30 of the tube 25 to a point spaced forwardly from the rear end 29 of the tube, and at this point defines an upper shoulder 32. The shoulder 32 is provided with a shallow notch 36. The bottom of the side wall 28 is provided with a relatively short longitudinal slot 38 opening through the forward end 27 of the tube and its rear end defines a lower shoulder 40, to be engaged by the pistol grip 42 on a fishing rod 44 whose butt 45 is engaged in the tube 25, with a usual reel seat on the rod extending upwardly through the upper slot 34 and the butt end 46 of the fishing rod 44 spaced from the rear end 29 of the socket 24, as shown in Figure 2, or projecting rearwardly therethrough, depending upon the type of fishing rod involved.

A pair of wing plates 48 and 50 are secured to and project laterally outwardly from opposite sides of the tube 25 and are longitudinally spaced from the ends of the tube, and are disposed in a common plane above the axis of the tube. The wing plates are generally triangular in shape and are formed of relatively thin sheet material and are secured to the sides of the tube 25 along their laterally inward straight side edges 52, as by welding, brazing, or any other suitable means. The rear ends 54 and 56 of the wing plates 48 and 50 are formed into sleeves 58 and 60, respectively, which have open outer ends at the outer arcuate edges 62 and 64 of the wing plates 48 and 50. The sleeves 58 and 60 receive the free inner ends of the arms 18 and 20 on the stakes 10 and 12, respectively, whereby the socket 24 is rotatably mounted on and between the stakes 10 and 12. The wing plates 48 and 50 serve to reinforce the socket 24. The pivotal mounting of the socket 24 is displaced to the rear of the longitudinal center of the socket, so that the socket is forwardly overbalanced.

A link chain 66 is secured at its upper end to the underside of the tube 25 at its rear end 29, as by a screw or rivet 68. A down-turned hook 70 is secured to the rear side of the cross brace 22 beneath the socket 24, and links of the chain 66 are to be selectively engaged with the hook 70 to hold the socket 24 at a desired rearwardly tilted angle.

It should be noted that the lower slot 38 in the tube 25 receives the pistol grip 42 of the rod 44 and prevents axial rotation of the rod 44 and also further rearward movement of the rod, relative to the socket 24.

While there are shown and described the preferred embodiment of the invention, it is to be understood that the structure is susceptible to change and modification within the scope of the claims appended hereto.

What is claimed is:

1. In a fishing rod butt holder, a butt receiving socket comprising a tube having a side wall, reinforcing wing plates fixed along and projecting laterally outwardly from opposite sides of said tube, transverse sleeves on said wing plates having open outer ends, a vertical support comprising laterally spaced vertical spikes having ground piercing lower ends and upper ends, a cross brace extending between and fixed to the stakes below their upper ends, said socket being positioned between the stakes at their upper ends, and laterally inwardly projecting arms on the upper ends of the stakes rotatably engaged in the open outer ends of the sleeves.

2. In a fishing rod butt holder, a butt receiving socket, sleeves on and projecting laterally from opposite sides of the socket, a vertical support comprising a pair of laterally spaced vertical spikes having lower ends and upper ends, a cross brace extending between and fixed to the spikes below their upper ends, the spikes being otherwise unconnected to each other, and laterally inwardly extending arms on the upper ends of the spikes rotatably engaged in said sleeves.

3. In a fishing rod butt holder, a butt receiving socket, sleeves on and projecting laterally from opposite sides of the socket, a vertical support comprising a pair of laterally spaced vertical spikes having lower ends and upper ends, a cross brace extending between and fixed to the spikes below their upper ends, the spikes being otherwise unconnected to each other, and laterally inwardly extending arms on the upper ends of the spikes rotatably engaged in said sleeves, said cross brace having a hook thereon, and a chain secured to and depending from said socket at one side of said sleeves, said chain having links which are selectively engageable on said hook for holding the socket in tilted position.

References Cited in the file of this patent

UNITED STATES PATENTS

| | | |
|---|---|---|
| 1,009,540 | Martin | Nov. 21, 1911 |
| 2,299,629 | Jordan | Oct. 20, 1942 |
| 2,548,328 | Thayer | Apr. 10, 1951 |
| 2,713,741 | Gnagy | July 26, 1955 |
| 2,724,569 | Licata | Nov. 22, 1955 |
| 2,756,954 | Whitlow | July 31, 1956 |

FOREIGN PATENTS

| | | |
|---|---|---|
| 171,290 | Great Britain | Nov. 17, 1921 |